(12) United States Patent
Hathcock

(10) Patent No.: US 7,310,927 B1
(45) Date of Patent: Dec. 25, 2007

(54) HORSE BLANKET

(76) Inventor: H. Glen Hathcock, 205 Mikus Rd., Weatherford, TX (US) 76087

( * ) Notice: Subject to any disclaimer, the term of this patent is extended or adjusted under 35 U.S.C. 154(b) by 0 days.

(21) Appl. No.: 11/708,450

(22) Filed: Feb. 20, 2007

Related U.S. Application Data

(63) Continuation-in-part of application No. 11/048,143, filed on Feb. 1, 2005, now Pat. No. 7,231,754, which is a continuation-in-part of application No. 10/669,737, filed on Sep. 24, 2003, now Pat. No. 6,877,300.

(51) Int. Cl.
*B68G 3/00* (2006.01)

(52) U.S. Cl. ..................................... 54/79.3

(58) Field of Classification Search ........ 54/79.1–79.4; 119/850; D30/144, 145
See application file for complete search history.

(56) References Cited

U.S. PATENT DOCUMENTS

| | | | | |
|---|---|---|---|---|
| 185,201 | A | | 12/1876 | Adams |
| 301,211 | A | * | 7/1884 | Canan ........................ 54/79.2 |
| 805,925 | A | | 11/1905 | Meyers |
| 3,839,845 | A | | 10/1974 | Hickey |
| 4,355,600 | A | * | 10/1982 | Zielinski ..................... 119/850 |
| 4,955,182 | A | * | 9/1990 | Newman ..................... 54/79.2 |
| 5,161,352 | A | * | 11/1992 | Schneider et al. ........... 54/79.2 |
| 5,271,211 | A | * | 12/1993 | Newman ..................... 54/79.2 |
| 5,345,751 | A | * | 9/1994 | Edwards ..................... 54/80.2 |
| 5,839,395 | A | | 11/1998 | Kelley et al. |
| 6,003,290 | A | * | 12/1999 | Hsi-Chang .................. 54/79.1 |
| 6,024,055 | A | * | 2/2000 | Jesse et al. ................. 119/850 |
| D423,737 | S | | 4/2000 | MacGuinness |
| 6,058,890 | A | * | 5/2000 | Harrell ....................... 119/850 |
| 6,318,054 | B1 | * | 11/2001 | Gatto .......................... 54/79.4 |
| 6,408,604 | B1 | * | 6/2002 | Schneider ................... 54/79.1 |
| 6,467,244 | B1 | | 10/2002 | Kelley et al. |
| 6,877,300 | B1 | * | 4/2005 | Hathcock .................... 54/79.2 |
| 2006/0042199 | A1 | | 3/2006 | Donahue |

FOREIGN PATENT DOCUMENTS

EP 0 595 423 A1 5/1994

\* cited by examiner

*Primary Examiner*—Thomas Price
(74) *Attorney, Agent, or Firm*—Geoffrey A. Mantooth

(57) ABSTRACT

A horse blanket has a back portion and side portions that extend down from the back portion. A neck opening is located between a neck end of the back portion and a chest area. A fleece portion lines an edge of the neck opening, with the fleece portion located so as to be aligned with the mane of a horse wearing the blanket. The fleece portion is removably coupled to the neck opening edge. This allows the fleece portion to be removed from the blanket and cleaned separately from the blanket and also allows the replacement of the fleece portion when worn or soiled.

9 Claims, 7 Drawing Sheets

HORSE BLANKET

This application is a continuation-in-part of U.S. application Ser. No. 11/048,143, filed Feb. 1, 2005 now U.S. Pat. No. 7,231,754, which is a continuation-in-part of U.S. application Ser. No. 10/669,737, filed Sep. 24, 2003 now U.S. Pat. No. 6,877,300.

FIELD OF THE INVENTION

The present invention relates to blankets for covering and protecting animals such as horses.

BACKGROUND OF THE INVENTION

During the winter months, horses are turned out to pasture to feed on grass and hay and to exercise. In order to keep their horses warm and dry, many owners provide turnout blankets (also known as European or English-style blankets). The blanket covers the back of the horse, from the neck to the tail and drapes down along the sides of the horse. The belly of the horse typically remains exposed, while the chest area, beneath the front of the neck, is typically covered. The horse blanket has an opening for receiving the horse's neck. A horse wearing a turnout blanket has some freedom of movement and can comfortably exercise in a pasture.

In addition, in some locales, a blanket is provided for a horse in a barn or stable as many barns are unheated. These are known as stable blankets and are contoured or tailored to fit the horse more snuggly than a turnout blanket. A stable blanket typically has a seam along the back.

Conventional horse blankets cause wear to occur on a horse's mane and tail. Conventional blankets have synthetic webbing around the blanket edges. The webbing is abrasive and can rub off the hair where there is pressure. When a blanket is placed on a horse, gravity creates a pressure point across the top of the neck where the mane is located.

As a preventative measure, some horse blankets have a cushion of synthetic or natural fleece at the top of the neck opening. This fleece protects the mane. Unfortunately, the fleece is susceptible to picking up dirt and mud. For example, many horse owners put their horses in paddocks or pastures during the day for exercise. If the weather is cold or wet, the horse wears a blanket. Horses will roll on the ground, scratching their backs. This causes the fleece to pick up dirt or mud. When the mud dries, the collar becomes abrasive and can rub the hair off. The blanket can be washed to clean the fleece, but the horse is unable to wear the blanket during the washing and drying process. In addition, washing and drying the blanket is a laborious and time consuming process.

SUMMARY OF THE INVENTION

The horse blanket of the present invention comprises a back portion having a neck end and a tail end. Side portions are arranged to depend from the back portion when the blanket is on a horse. The side portions extend from the tail end to a chest area. A neck opening is located between the neck end of the back portion and the chest area. A fleece portion lines an edge of the neck opening. The fleece portion is located so as to be aligned with a mane of a horse wearing the blanket. The fleece portion is removably coupled to the neck opening edge.

In accordance with one aspect of the present invention the neck opening is elasticized for substantially the entire circumference of the neck opening.

In accordance with another aspect of the present invention the back portion has a notch that opens to the neck opening. The notch is located so as to align with the mane. The notch is lined with fleece.

In accordance with still another aspect of the present invention the fleece portion comprises plural segments, with each segment making up a length of the fleece portion.

In accordance with still another aspect of the present invention the fleece portion is removably coupled to the neck opening edge by way of a hook and loop fastener.

In accordance with still another aspect of the present invention the loops of the hook and loop fastener are coupled to the blanket and the hooks of the hook and loop fastener are coupled to the fleece portion.

In accordance with still another aspect of the present invention the fleece portion wraps around the neck opening edge.

DESCRIPTION OF THE PREFERRED EMBODIMENT

The present invention provides a fleece portion that lines the edge of openings, such as the neck opening and tail opening, of a horse blanket. The fleece portion softens the webbing on the edge of the blanket and prevents the blanket from wearing or rubbing on the horse's mane or tail.

In addition, the fleece portion is removably coupled to the blanket. This allows the fleece portion to be removed and cleaned separately from the remainder of the blanket. Alternatively, the fleece portion can be replaced, without the need to replace the entire blanket.

In the description that follows, several horse blankets are described, which blankets utilize the fleece portion. One type of blanket is described with reference to FIGS. 1-2. Another blanket is described with reference to FIG. 3. Still another horse blanket is described with reference to FIGS. 4-7. The removable fleece portion is described more fully with reference to FIGS. 8-10.

Figure 1:
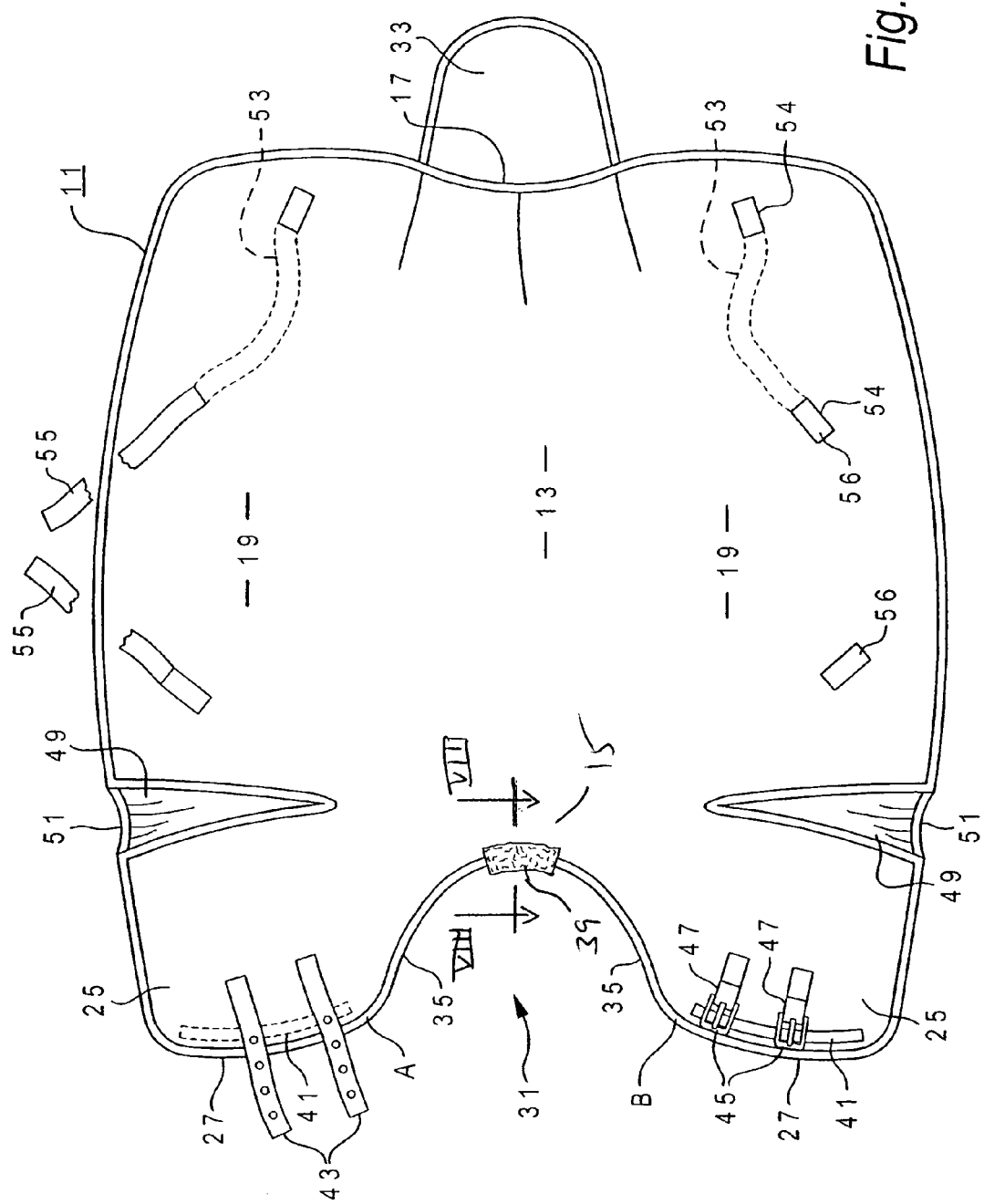
FIG. 1 is a plan view of a horse blanket of the present invention, in accordance with a preferred embodiment.
Figure 2:
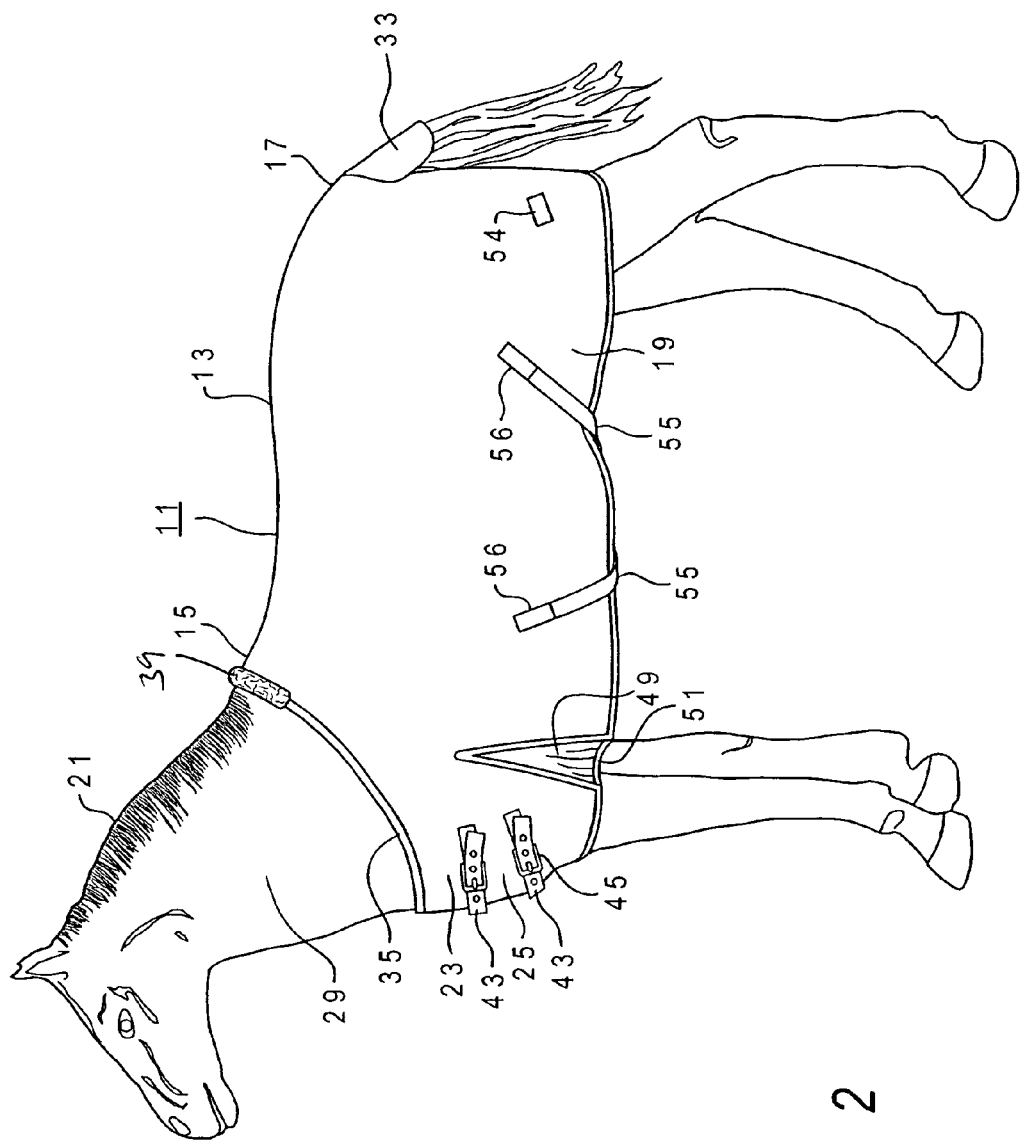
FIG. 2 is a side view of the blanket of FIG. 1, shown on a horse.

In FIGS. 1 and 2, there is shown the horse blanket 11 of the present invention, in accordance with a preferred embodiment. The blanket 11 is a turnout blanket, suitable for use on a horse that is turned out to pasture and exposed to the weather.

The blanket 11 can be made out of a variety of materials. For example, in the preferred embodiment, the turnout blanket is made of a waterproof nylon outer layer, a nylon liner or inner layer and a polyfill insulation in between. However, other materials besides nylon and polyfill can be used. For example, the outer layer need not be waterproof. This is particularly true if the blanket is a stable blanket and meant for use inside of a stable or barn. Furthermore, the blanket can be made out of a variety of materials of different weights.

The blanket 11 has a back portion 13 that extends between a neck end 15 and a tail end 17 of the blanket. Side portions 19 extend from the back portion 13. When the blanket 11 is on a horse 21, the back portion 11 extends along the back of the horse, while the side portions 19 depend down along the sides of the horse. The side portions 19 extend from the tail end 17 to a chest area 23 of the horse. The side portions 19 have front flaps 25. The flaps 25 have front edges 27 that are designed to overlap slightly; the flaps 25 cover the chest area or front area 23 of the horse below the neck 29. A neck opening 31 is formed in the blanket between the front flaps 25 and the neck end 15 of the back portion. The blanket can have a tail flap 33 at the tail end 17.

The edge 35 of the blanket that defines the neck opening 31 is shown in FIG. 1, and extends from point A to point B. The neck opening edge 35 is elasticized from point A to point B to allow the neck opening to stretch. When the flaps 25 are closed and overlapping, the entire circumference of the neck opening is elasticized. Thus, point A overlaps point B. If the neck is particularly large, point A may be separated from point B by a short distance, wherein the neck opening is elasticized for substantially the entire circumference.

In the preferred embodiment, the stretch-to-relaxation elastic ratio is 10:9, meaning that when the edge 35 is stretched to a 10 inch length, the edge is 9 inches upon relaxation. This is a relatively loose fit, as the neck opening is not too constricting around the horse. If the ratio is smaller, such as 10:7, then the blanket irritates the horse because the neck opening feels too constricting to the horse.

Figure 8:
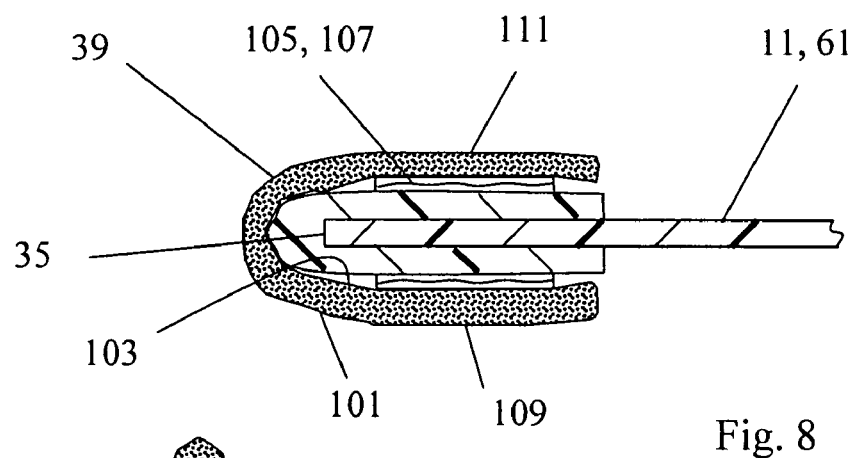
FIG. 8 is a cross-sectional view of the blanket edge, taken through lines VIII-VIII of FIG. 1 and showing the removable fleece portion.
Figure 9:
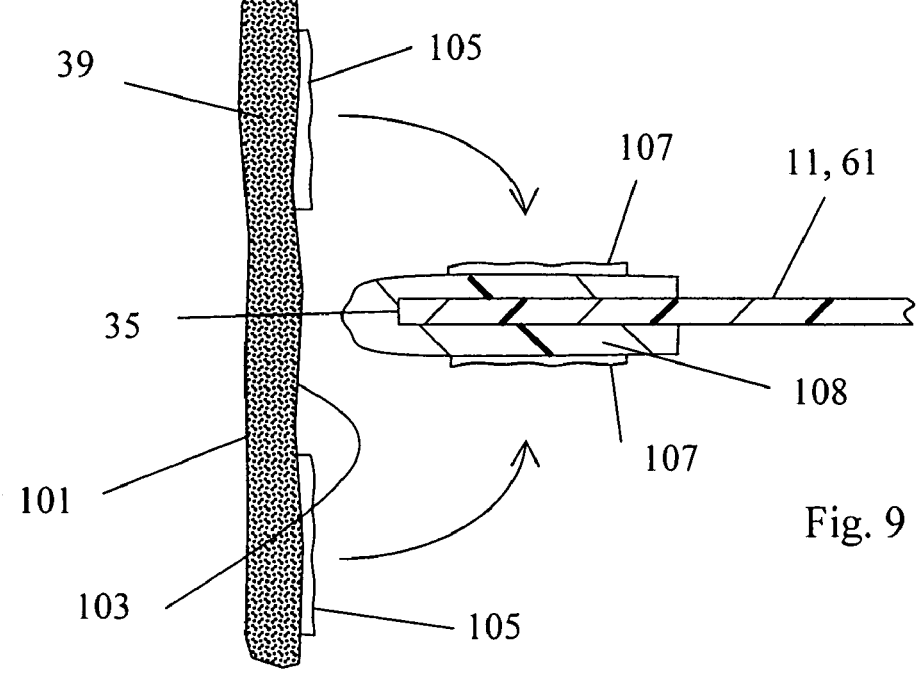
FIG. 9 is a cross-sectional, exploded view of the fleece portion of FIG. 8 which is unattached to the blanket.
Figure 10:
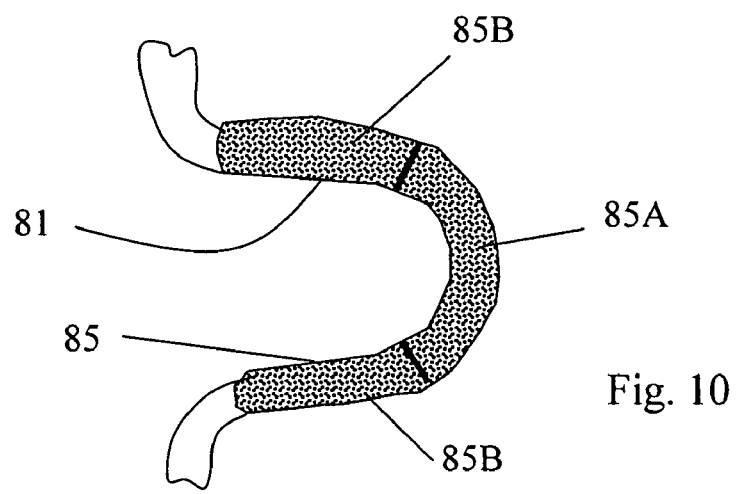
FIG. 10 is a plan view of a segmented fleece portion that is used on a notch.

A length of fleece 39 lines a portion of the edge of the neck opening. The fleece portion 39, which will be described in more detail below with reference to FIGS. 8-10, is located where the blanket contacts the mane of the horse.

The two side flaps 25 couple together with hook and loop fasteners 41. A strip of hooks is on one flap 25 and a strip of loops is located inside of another flap. When the flaps 25 overlap, the hook and loop fasteners 41 retain the flaps in place. Front straps 43 on one flap 25 are then secured to buckles 45 on the other flap. The straps provide a more secure coupling than the hook and loop fasteners. The strap and buckle arrangements are elasticized. In the preferred embodiment, the straps 43 are nylon webbing and the buckles 45 are secured to the blanket material by elastic straps 47. Thus, the strap connection to the blanket material has elasticity.

The blanket 11 is also fitted with gussets 49 at the side portions 19, near the front legs of the horse. Each gusset 49 is a wedge-shaped piece of material, gathered along the bottom edge 51. The bottom edge 51 is elasticized. In the preferred embodiment, the bottom edge of the gusset has an elastic stretch-to-relaxation ratio of 10:5.

In addition, rear leg straps 53 are provided on the inside of the blanket. These rear leg straps 53 are elastic and are adjustable in length. The rear leg straps extend around the inside of the rear legs of the horse. The ends of the rear leg straps clip on to rings or other attachment devices which are secured to the blanket by webbing 54 and stitching.

Furthermore, at least one elastic belly band 55 or belly strap is provided. In the preferred embodiment, two belly straps 55 are provided, one located close to the front legs and the other located closer to the rear legs. The belly straps extend underneath the belly of the horse. The length of each belly strap is adjustable and the ends are clipped or hooked to rings or other attachment devices 56 on the blanket (for example, Malaysian hooks).

The blanket 11 is sized to fit on a horse by measuring from the center of the chest to the tip of the tail. Once sized, the blanket 11 is put onto the back and sides of the horse. The front flaps 25 are overlapped and secured with the hook and loop fasteners 41. The front straps 43 are secured to the buckles 45. The belly straps 55 and the rear leg straps 53 are then adjusted and secured.

The blanket fits snuggly to the horse. The edge 35 of the neck opening 31 fits close around the horse's neck, with the elastic closing off any openings between the horse and the blanket. Thus, the blanket is suited for use on a variety of horses such as quarter horses with thick necks and thoroughbreds with thinner necks. When a horse is out in a pasture exposed to adverse weather, wind and rain are unable to enter the neck opening due to the close fit.

Likewise, the sides of the blanket fit close for the horse to provide a snug fit. The chest straps 43 and side gussets 49 provide a snug fit to the front portions of the horse.

Yet, the blanket 11 allows the horse to exercise. The stress areas are elasticized. For example, if the horse walks or runs, the front legs are not constricted because the gussets 49, with the elasticized bottom edges 51 and gathered material, provide flexibility to the blanket in the area of the front legs. The horse is thus able to move its front legs without being constricted to an unpleasant degree by the front aspects of the blanket. When the horse stops running or walking, the blanket returns to its snug fit around the front legs of the horse. The rear legs are generally unconstricted by the blanket; and in any event, the elastic rear leg straps provide flexibility.

If the horse bends its head down to eat at ground level, the neck opening 31 provides flexibility. In a conventional, tight-necked blanket, the neck tends to push down on the bottom of the neck opening and pull on the top of the neck opening. With the blanket of the present invention, the horse is thus able to eat without feeling choked around the bottom of the neck opening. When the horse returns to its up position, the neck opening 31 continues to provide a snug fit.

The elasticized neck opening, front straps and front leg gussets provide flexibility at the stress areas of the blanket. Consequently, the straps, and their attachments to the blanket, are less likely to break or pull out from the blanket, thereby increasing the durability of the blanket. In addition, the horse is content with a blanket that does not restrict exercise, while remaining snug to keep the horse warm and dry.

Figure 3:
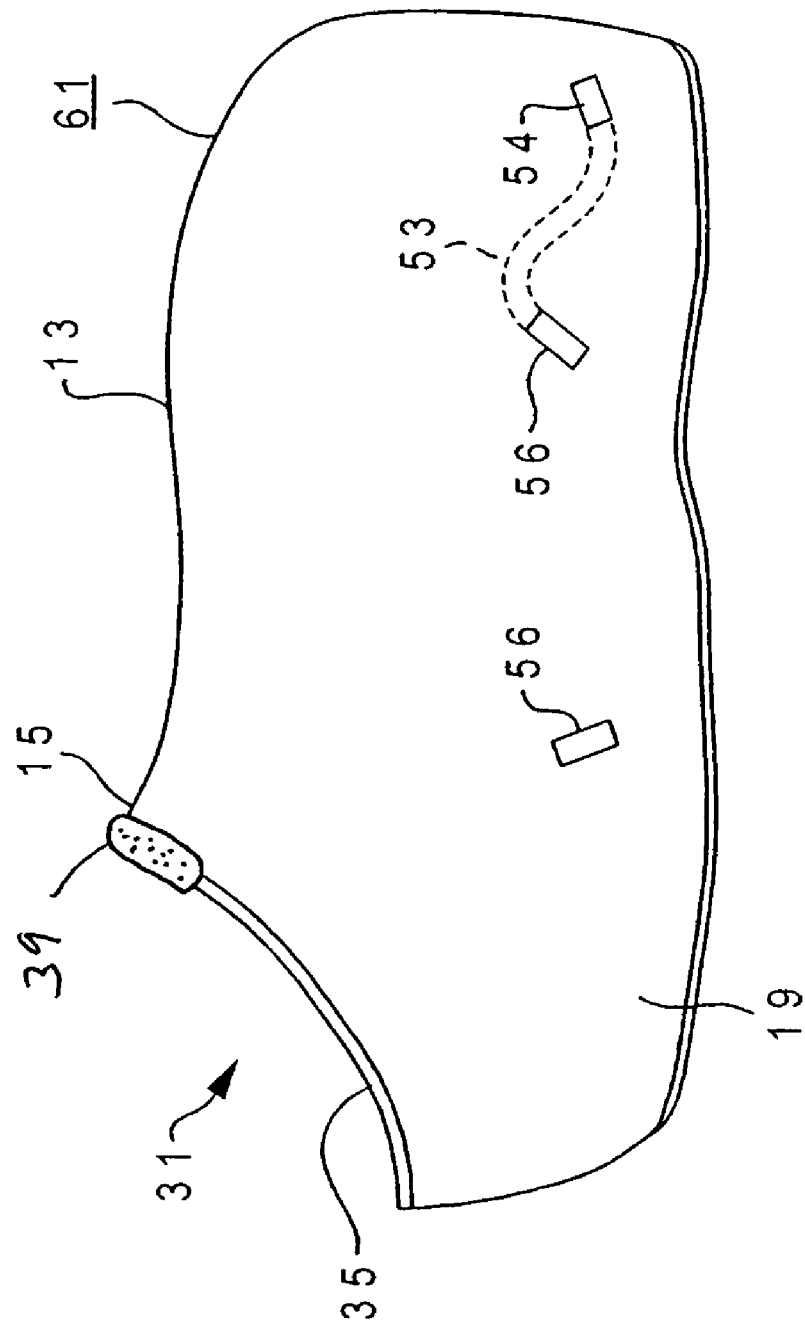
FIG. 3 is a side view of a horse stable blanket, in accordance with another embodiment.

FIG. 3 illustrates another embodiment of the blanket 61. The blanket is a stable blanket. Stabled horses typically engage in little or no exercise. The blanket has an elasticized neck opening 31. The blanket has no front leg area gussets. Also, the front straps (not shown) need not be elasticized. The blanket 61 has a fleece portion 39 lining the edge 35 of the neck opening 31. The fleece portion 39 is located so as to contact, or be aligned with, the horse's mane when the blanket is on a horse.

Many stables are unheated. Thus, owners provide blankets for their horses in cold weather. The elasticized neck opening allows the horse to lower its head to feed, while maintaining a snug fit when the head returns to an elevated position. The back portion 13 of the stable blanket forms a contoured fit to the horse's back.

FIGS. 4-7 show the blanket 11A of the present invention, in accordance with another embodiment. The blanket 11A is substantially similar to the blanket 11, except as discussed below.

The blanket 11A has two notches 81, 83 for reducing the wear on a horse's mane and tail. One notch 81 is at the mane, while the other notch 83 is at the tail.

Figure 4:
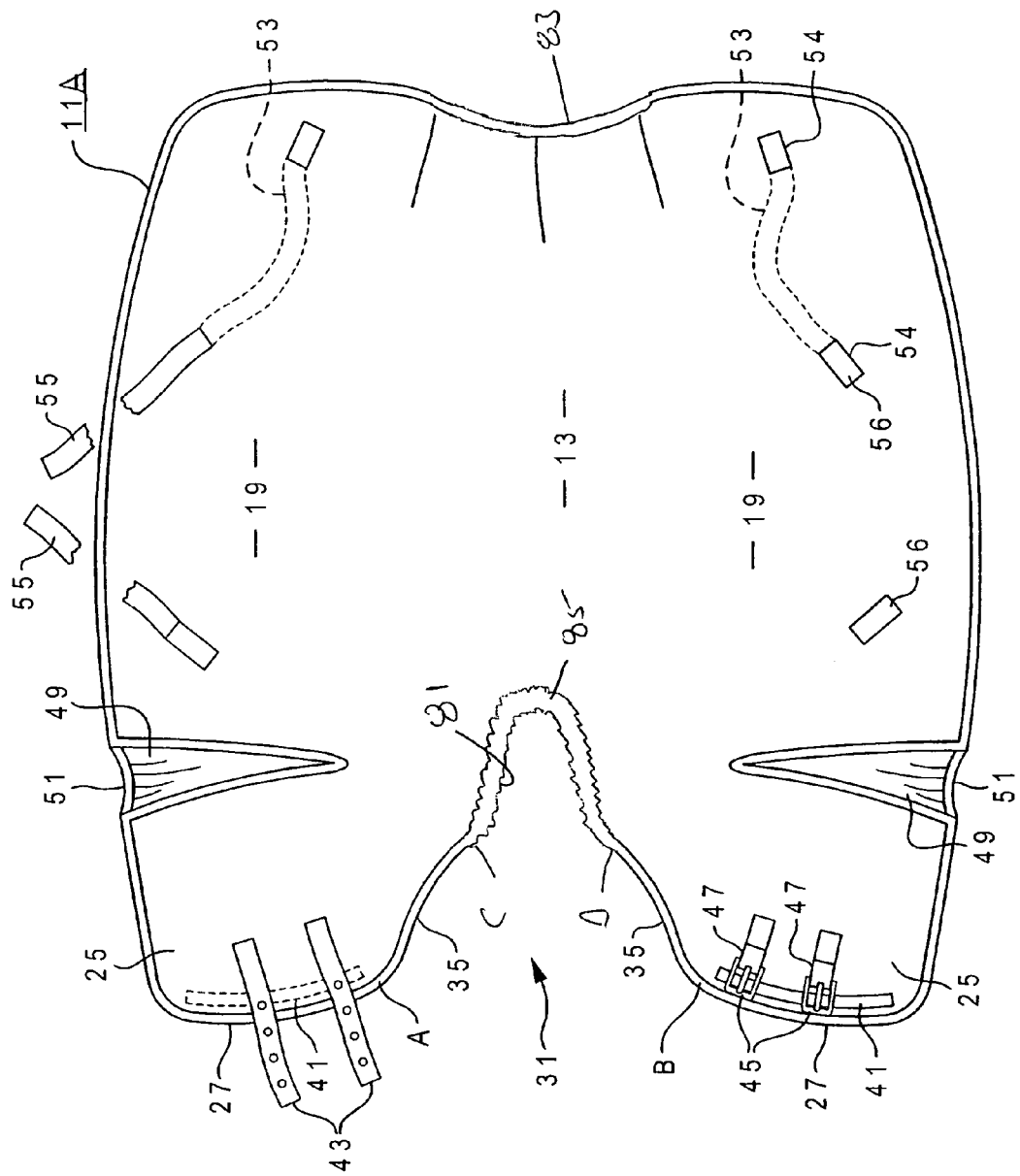
FIG. 4 is a plan view of a horse blanket of the present invention, in accordance with another embodiment.

The mane notch 81 is located in the center of the back portion between the two side portions 19 (see FIG. 4). The mane notch 81 opens to the neck opening 31. Thus, if the neck opening 31 is itself considered as a notch, then the mane notch 81 is a notch within a notch. The edge of the main notch is lined with fleece 85.

Figure 5:
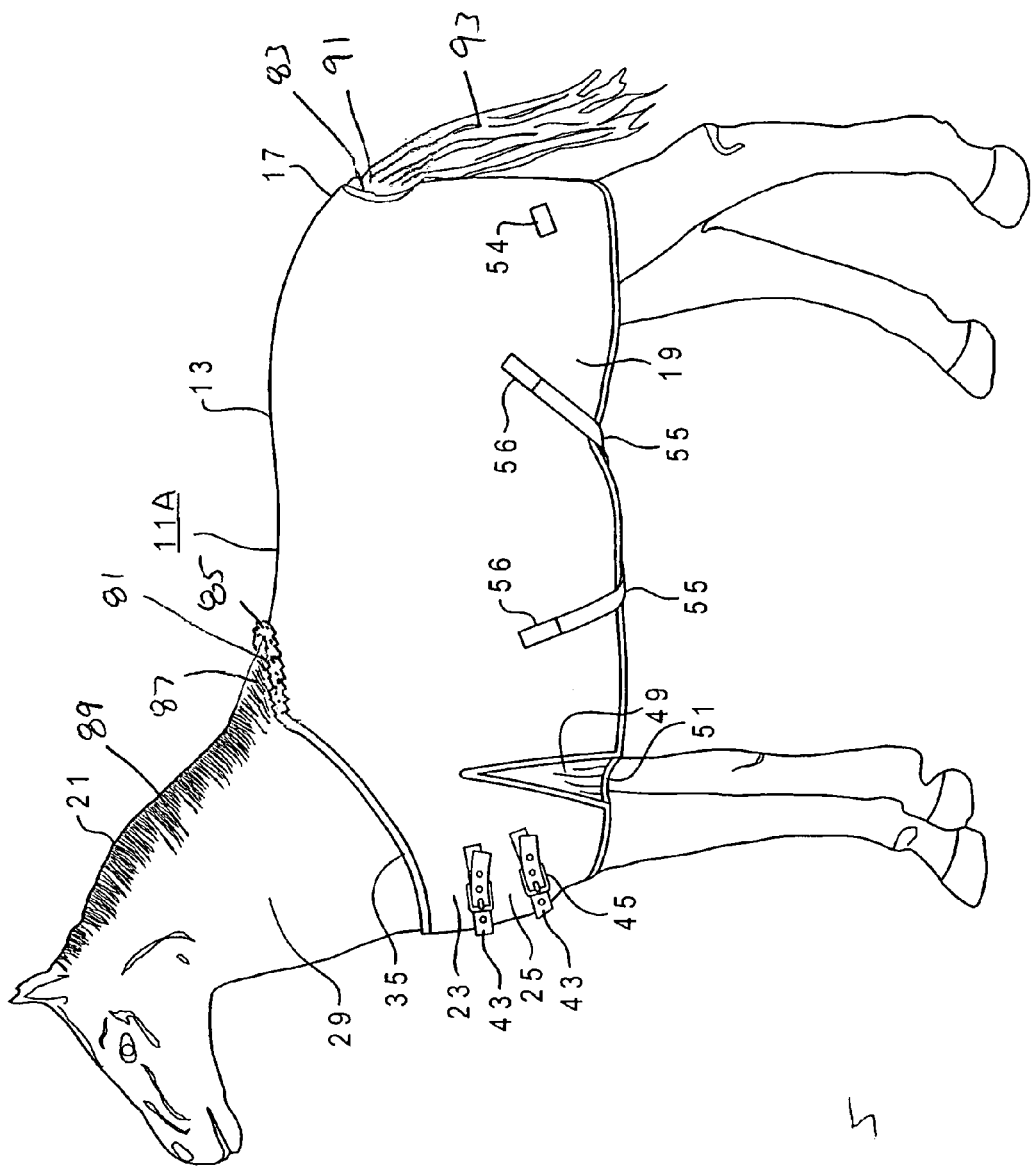
FIG. 5 is a side view of the blanket of FIG. 4, shown on a horse.
Figure 6:
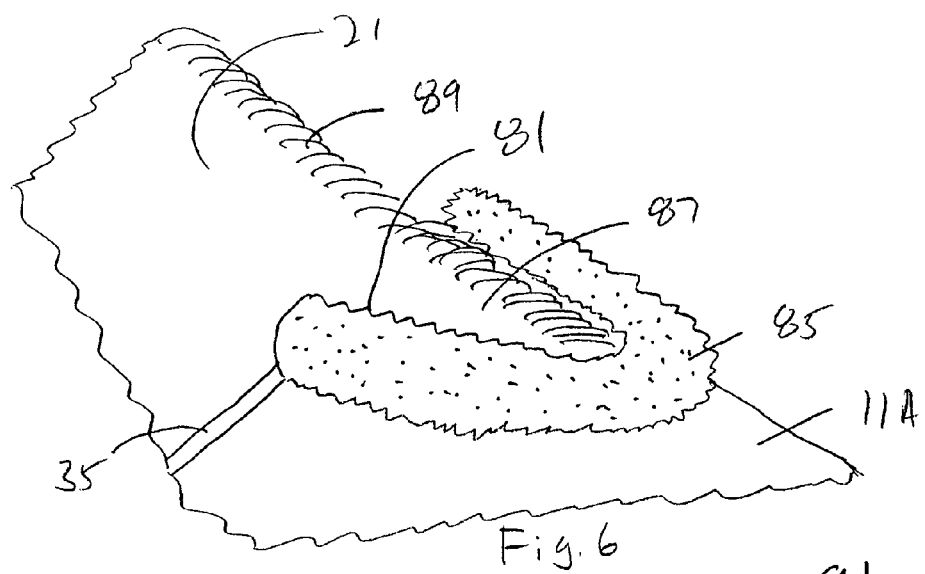
FIG. 6 is a view of the mane end of the blanket of FIG. 4, shown on a horse.
Figure 7:
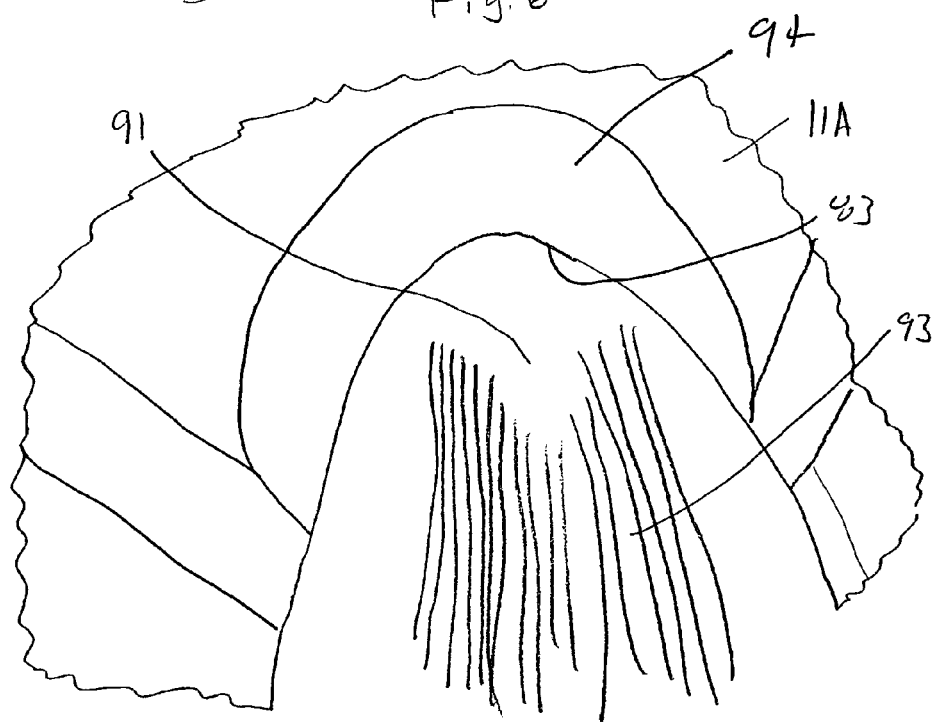
FIG. 7 is a view of the tail end of the blanket of FIG. 4, shown on a horse.

The width and length of the notch 81 at the neck opening is sufficient so that the withers 87 are uncovered by the blanket (see FIGS. 5 and 6). The lower end of the mane 89 extends down to the withers. Thus, the mane notch 81 leaves the lower end of the mane exposed and consequently not subject to wear.

The edge 35 of the neck opening 31 is elasticized from point A to point C and from point B to point D (see FIG. 4). The edge of the mane notch 81 is not elasticized. The elastic in the neck opening maintains the blanket in place on the horse.

The blanket 11A is suited for use on a variety of horses, just like the blanket 11. The blanket 11A allows the horse to exercise and bend its head down to ground level, just as does the blanket 11. In addition, the elastic in the neck opening edge 35 serves to close the neck opening around the horse's neck and prevent wind and rain from entering through the neck opening. As shown in FIG. 5, the elastic neck opening edge 35 allows the blanket to extend relatively high on the shoulder (and even to the bottom of the neck on some horses), thereby leaving more of the horse covered. By uncovering just the lower part of the mane 89 with the mane notch 81, the coarse mane hairs are not rubbed off.

The blanket 11A has no tail flap 33. Instead, a tail notch 83 (see FIGS. 4, 5 and 7) is formed so as to leave the dock 91 of the tail 93 uncovered. The edge of the tail notch 83 can be lined with felt 94, fleece, etc. The edge of the tail notch 83 is elasticized. The tail notch 83 prevents the blanket from rubbing the tail hair away.

The blanket 11A thus provides adequate cover for a horse, while preserving the hair on the mane 89 and the tail 93.

FIGS. 8 and 9 show a cross-sectional, or edge, view of the fleece portion 39. The fleece portion is made of synthetic or natural fleece, which fleece is soft and has a deep pile. The fleece portion 39 has an outside 101 and an inside 103. Part of the outside 101 is in contact with the horse. The inside 103 faces the blanket.

The fleece portion 39 can be coupled to the blanket and uncoupled from the blanket. The fleece portion 39 is secured to the blanket with removable fasteners. In the preferred embodiment, the fasteners are of the hook and loop type 105, 107. In the preferred embodiment, the hook material 105 is coupled to the inside 103 of the fleece portion, while the loop material 107 is coupled to the blanket along the inside and outside of the webbing 108. The hook and loop materials 105, 107 are stitched to the respective fleece portion and blanket. This arrangement of the hook and loop materials allow the blanket to be used without the fleece portion 39, wherein the soft loops 107 are in contact with the horse. The hooks 105 are stiffer and feel like bristles and can cause wear or rubbing if in contact with the horse. The fleece portion 39 has hook material 105 that couples to the two pieces of loop material 107 on the blanket. The fleece portion 39 wraps around the edge 35 of the blanket so as to have a lower part 109 that is interposed between the blanket and the horse and an upper part 111 that is exposed and on top of the blanket.

If the fleece portion 39 becomes dirty or caked with dirt, it is removed from the blanket by simply pulling it off of the loop material 107. The fleece portion 39 can be removed while the blanket is still on the horse. Once removed, the fleece portion can be washed separately from the remainder of the blanket and after cleaning is reinstalled onto the blanket. Alternatively, if the fleece portion has become worn or is too dirty for cleaning, it can be replaced with a new or cleaner fleece portion.

The fleece portion 39 is reversible in the sense that if the lower part 109 becomes soiled or dirty and the upper part 111 is clean, then the fleece portion can be pulled off, inverted, and recoupled to the blanket, wherein what was formerly the lower part 109 is now the upper part and what was formally the upper part 111 is now the lower part. This puts the cleaner part of the fleece portion in contact with the horse.

FIG. 10 illustrates the fleece portion 85 used in a notch, such as the mane notch 81. The fleece portion could be made in a single continuous length (see FIG. 4). Alternatively, to save on material or facilitate installation and cleaning, the fleece portion could be segmented as shown in FIG. 10. The fleece portion has a center segment 85A and two lateral segments 85B. Each segment 85A, 85B is provided with fasteners, such as of the hook and loop type, to removably couple to the blanket. Thus, the individual segments 85A, 85B can be removed and reinstalled onto the blanket.

Although the fleece portions 39, 85 have been described in conjunction with an elasticized neck opening, the fleece portions could be used with the blanket having non-elastic neck openings. Also, the fleece portions can be used on blankets, such as turn out blankets and stable blankets, and can also be used on sheets.

Although the removable fleece portion 39, 85 has been described in conjunction with neck openings, the fleece portions could be used in other areas where wear or rubbing is a problem, such as at the horse's tail.

Although the removable fleece portion has been described in conjunction with natural or synthetic fleece, other soft materials can be used instead of fleece. For example, felt could be used. Felt becomes dirty and requires periodic cleaning. The removable portion, made from felt or other soft material, can be removed from the blanket and cleaned separately from the blanket. Alternatively, the removable portion can simply be replaced.

The foregoing disclosure and showings made in the drawings are merely illustrative of the principles of this invention and are not to be interpreted in a limiting sense.

The invention claimed is:

1. A horse blanket, comprising:
  a) a back portion having a neck end and a tail end;
  b) side portions extending downward from the back portion when the blanket is on a horse, the side portions extending from the tail end to a chest area;
  c) a neck opening located between the neck end of the back portion and the chest area;
  d) a fleece portion lining an edge of the neck opening, the fleece portion is adapted to be aligned with the mane of a horse wearing the blanket, the fleece portion removably coupled to the neck opening edge.

2. The horse blanket of claim 1 wherein the neck opening is elasticized for substantially the entire circumference of the neck opening.

3. The horse blanket of claim 1 wherein the back portion has a notch that opens to the neck opening, with the notch adapted to align with the mane, the notch lined with the fleece.

4. The horse blanket of claim 3 wherein the neck opening is elasticized for substantially the entire circumference of the neck opening.

5. The horse blanket of claim 3 wherein the fleece portion comprises plural segments, with each segment making up a length of the fleece portion.

6. The horse blanket of claim 1 wherein the fleece portion is removably coupled to the neck opening edge by way of a hook and loop fastener.

7. The horse blanket of claim 6 wherein the loops of the hook and loop fastener are coupled to the blanket and the hooks of the hook and loop fastener are coupled to the fleece portion.

8. The horse blanket of claim 6 wherein the fleece portion wraps around the neck opening edge.

9. The horse blanket of claim 1 wherein the fleece portion wraps around the neck opening edge.

* * * * *